United States Patent
West et al.

(10) Patent No.: US 6,434,683 B1
(45) Date of Patent: Aug. 13, 2002

(54) METHOD AND SYSTEM FOR TRANSFERRING DELTA DIFFERENCE DATA TO A STORAGE DEVICE

(75) Inventors: Christopher J. West, Boulder; David A. Serls, Littleton, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/707,242

(22) Filed: Nov. 7, 2000

(51) Int. Cl.$^7$ ................................................ G06F 11/00
(52) U.S. Cl. ........................................ 711/162; 711/161
(58) Field of Search .................................. 711/161, 162

(56) References Cited

U.S. PATENT DOCUMENTS

| | | | |
|---|---|---|---|
| 5,155,845 A | * 10/1992 | Beal et al. | ........................ 714/6 |
| 5,555,371 A | * 9/1996 | Duyanovick et al. | |
| 5,623,599 A | * 4/1997 | Shomler | ........................ 714/18 |
| 5,692,155 A | * 11/1997 | Iskiyan et al. | ................ 711/162 |
| 5,835,954 A | * 11/1998 | Duyanovich et al. | ........ 711/162 |
| 6,012,063 A | 1/2000 | Bodnar | |
| 6,131,148 A | * 10/2000 | West et al. | .................. 711/162 |

* cited by examiner

Primary Examiner—Reba I. Elmore
(74) Attorney, Agent, or Firm—Brooks & Kushman P.C.

(57) ABSTRACT

A method and system for transferring difference data (delta) between new and old data from a data transferring unit to a storage device having a copy of the old data for enabling the storage device to determine the new data based on the old data and the transferred difference data and then store the new data in place of the old data. Both of the data transferring unit and the target storage device have a copy of the old data. When new data is written at the data transferring unit to modify the old data the data transferring unit compares the new data with the old data to determine the difference data. The difference data is indicative of the differences between the new data and the old data. The target storage device merges the old data with the difference data to determine the new data. Upon determining the new data the target storage device discards the old data and stores the new data. The method and system may be used with peer-to-peer remote copy (PPRC) storage systems and storage area network (SAN) storage systems.

16 Claims, 3 Drawing Sheets

METHOD AND SYSTEM FOR TRANSFERRING DELTA DIFFERENCE DATA TO A STORAGE DEVICE

TECHNICAL FIELD

The present invention relates generally to a method and system for transferring difference data indicative of the differences between new data and old data to a storage device storing the old data for enabling the storage device to determine the new data based on the stored old data and the transferred difference data and then replace the old data with the new data.

BACKGROUND ART

As processing power increases and reduces the overhead associated with data transfers to storage devices, the remaining large component of time becomes the actual transfer of the data. It is difficult to speed the handshake of a data transfer so it is also difficult to make performance gains when transferring data to storage devices.

There are a variety of applications in which data is transferred from a transferring unit such as a cache or other memory to a target storage device in order to have the data copied onto the target storage device. These applications include peer-to-peer remote copy (PPRC) systems, storage area network (SAN) systems, and systems generally having some type of memory connected to a target storage device. In these applications the transferring unit has a copy of an old data file and the target storage device stores a copy of the old data file. A host computer or the like then changes the old data file at the transferring unit. The old data file then becomes an updated data file at the transferring unit. The updated data file reflects the changes made to the old data file by the host computer. The transferring unit then typically transfers an entire copy of the updated data file to the target storage device. The target storage device then replaces the stored old data file with the updated data file.

Transferring an entire copy of the updated data file from the transferring unit to the target storage device and then replacing the old data file with the copy of the updated data file takes too much time. It is desirable that only the changes or differences between the updated data file and the old data file be transferred from the transferring unit to the target storage device such that the target storage device can store a copy of the updated data file as quickly as possible.

SUMMARY OF THE INVENTION

Accordingly, it is an object of the present invention to provide a method and system for transferring difference data between new and old data to a storage device having a copy of the old data for enabling the storage device to determine the new data based on the old data and the transferred difference data and then replace the old data with the new data.

It is another object of the present invention to provide a peer-to-peer remote copy (PPRC) method and system for transferring difference data between new data and old data from a primary storage subsystem to a secondary storage subsystem having a copy of the old data for enabling the secondary storage subsystem to determine the new data from the old data and the transferred difference data and then replace the old data with the new data.

It is a further object of the present invention to provide a method and system for transferring difference data between new data and old data from a storage area network (SAN) to a target storage device having a copy of the old data for enabling the target storage device to determine the new data from the old data and the transferred difference data and then replace the old data with the new data.

It is still another object of the present invention to provide a method and system for transferring difference data between new data and old data from a cache to a target storage device having a copy of the old data for enabling the target storage device to determine the new data from the old data and the transferred difference data and then replace the old data with the new data.

In carrying out the above objects and other objects, the present invention provides a storage system having a data transferring unit and a target storage device. The data transferring unit has an old data file and a new data file. The data transferring unit includes a processor for comparing the new data file with the old data file to determine difference data indicative of the differences between the new data file and the old data file. The data transferring unit further has a transmitter for transmitting the difference data. The target storage device has the old data file and a receiver for receiving the difference data from the data transferring unit. The target storage device further includes a processor for merging the old data file with the difference data file to determine the new data file. Upon determining the new data file the target storage device replaces the old data with the new data.

The storage system may be a peer-to-peer remote copy (PPRC) storage system in which the data transferring unit is a primary storage subsystem of the PPRC storage system and the target storage device is a secondary storage subsystem of the PPRC storage system. The storage system may be a storage area network (SAN) storage system in which the target storage device is a storage device of the SAN storage system. In general, the data transferring unit may be a cache or other type of memory and the target storage device may be a relatively long term storage device such as disks, tape, optical media, and the like.

In carrying out the above objects and other objects, the present invention further provides a method for storing data in a storage system. The method includes storing an old data file at a data transferring unit and a target storage device. The transferring unit then receives a new data file and compares the new data file with the old data file to determine difference data indicative of the differences between the new data file and the old data file. The data transferring unit then transfers the difference data to the target storage device. Upon receiving the difference data from the data transferring unit the target storage device merges the old data file with the difference data file to determine the new data file. The target storage device then replaces the old data with the new data.

In carrying out the above objects and other objects, the present invention also provides a storage system having a first data transferring unit having first old and new data files. The first data transferring unit includes a first processor for comparing the first new and old data files to determine a first difference data indicative of the differences between the first new and old data files. The first data transferring unit has a first transmitter for transmitting the first difference data with first meta data. The first meta data is indicative of the first difference data being associated with the first data transferring unit and the first old and new data files. The storage system further includes a second data transferring unit having second old and new data files. The second data transferring unit includes a second processor for comparing the second new and data files to determine a second difference data indicative of the differences between the second new and old data files. The second data transferring unit has a second transmitter for transmitting the second difference data with second meta data. The second meta data is indicative of the second difference data being associated with the second data transferring unit and the second old and new data files.

The storage system also includes a target storage device having the first and second old data files. The target storage device has a receiver for receiving the first and second difference data and the first and second meta data from the first and second data transferring units. The target storage device further has a processor for merging the first and second old data files with the first and second difference data file to determine the first and second new data files, and for analyzing the meta data to determine which data transferring unit and old and new data files are associated with the difference data. Upon determining the first and second new data files the target storage device replaces the first and second old data files with the first and second new data files.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

In general, the present invention is a method and system for transferring difference data between new and old data files from a data transferring unit to a target storage device having a copy of the old data file. Instead of transferring an entire updated data file from the data transferring unit to the target storage device the method and system of the present invention only transfer the difference between the updated file and the old version of the data file to the target storage device. The target storage device determines the new data file from the old data file and the transferred difference data. The target storage device then replaces the old data file with the new data file. A data file includes one or more units of data.

In operation, both of the data transferring unit and the target storage device have a copy of the old data file. When the old data file is updated at the data transferring unit the data transferring unit determines the difference between the updated and old data files. Instead of transferring the updated data file, the transferring unit transfers the difference (delta) to the target storage device. The delta reflects the changes made to the old data file to produce the updated data file, i.e., the differences between the updated and old data files. Because the data size of the delta in a typical application is much smaller than the data size of the entire updated data file the speed of transferring the delta is much faster than the speed of transferring the entire updated data file. The target storage device then determines the updated data file from the old data file and the delta.

The data transferring unit determines the delta from comparing the new data file with the old data file. This comparison may include determining the offset location of the old data file being changed (i.e., offset location of change), the length of the number of data bytes being changed at the offset location (i.e., length of change), and the actual data bytes being changed (i.e., actual changed data bytes). The delta reflects the differences between the offset location, the length, and the actual changed data bytes between the new data file and the old data file. The target storage device uses this information associated with the delta to modify the stored old data file to determine the new data file.

Figure 1:
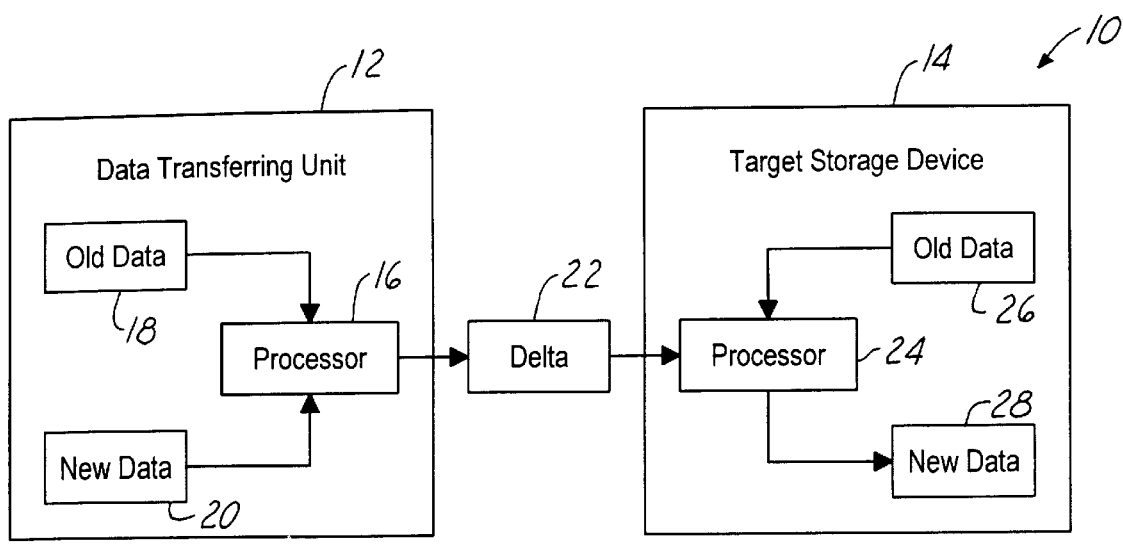
FIG. 1 illustrates a block diagram of a storage system for use with the method and system of the present invention.

Referring now to FIG. 1, a block diagram of a data storage system 10 for use with the method and system of the present invention is shown. Data storage system 10 includes a data transferring unit 12 and a target storage device 14. Data transferring unit 12 includes a processor 16 for determining the difference (delta) between an updated data file and an old version of the data file. Data transferring unit 12 includes a copy of the old data file 18 and a copy of the new or updated data file 20. The inputs to processor 16 include two data streams: 1) the old version of the data file 18 and 2) the updated version of the data file 20. In response to the two input data file streams 18 and 20, processor 16 outputs an output stream 22 describing the difference (delta) between the two input streams, i.e., the difference between the updated and old versions of the data files. Data transferring unit 12 then transfers delta 22 to target storage device 14.

Target storage device 14 includes a processor 24 for determining the updated data file from the old data file and the delta. Prior to the old data file being updated at data transferring unit 12 a copy of the old data file 26 is stored at target storage device 14. The inputs to processor 24 include two input data streams: 1) the old data file 26 and 2) the delta 22. In response to the two input data streams 22 and 26, processor 24 computes the updated data file and outputs an updated data file version stream. Storage 28 of target storage device 14 then stores the updated data file. An indication by data transferring unit 12 such as a flag transferred with the delta 22 could be used to signify to target storage device 14 that the data received is a delta and not the entire updated data file.

Figure 2:
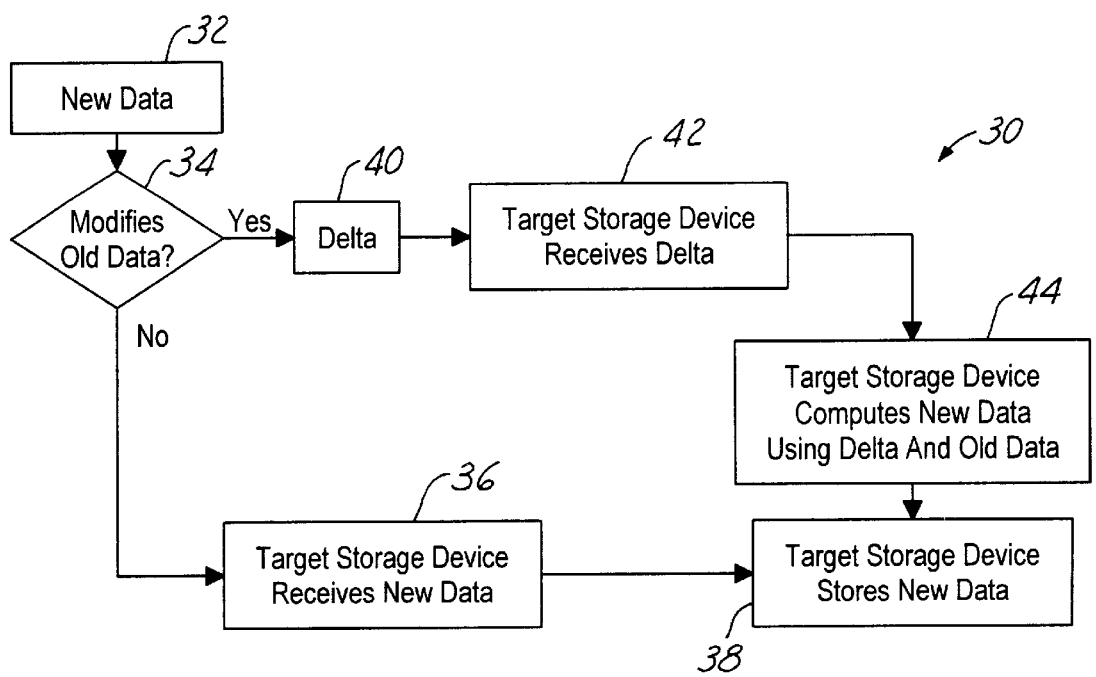
FIG. 2 illustrates a flowchart describing the operation of the method and system of the present invention.

Referring now to FIG. 2, with continual reference to FIG. 1, a flowchart 30 describing the operation of the method and system of the present invention is shown. Flowchart 30 begins with a host computer writing new data to data transferring unit 12 as shown in block 32. Data transferring unit 12 then determines if the new written data modifies a copy of an old data file stored on the data transferring unit and target storage device 14 as shown in decision block 34. If the new written data is not modifying a copy of an old data file stored on data transferring unit 12, then the data transferring unit transfers the new written data to target storage device 14 as shown in block 36. Target storage device 14 then stores the new written data as an updated data file as shown in block 38.

If the new written data is an updated version of an old data file stored on data transferring unit 12 and target storage device 14, then processor 16 of the data transferring unit determines the difference or delta between the old data file and the updated data file. The delta reflects the changes between the updated and old data files. Data transferring unit 12 then transfers the delta to target storage device 14 as shown in block 40. Upon target storage device 14 receiving the delta as shown in block 42, processor 24 of the target storage device determines the updated data file as shown in block 44. Processor 24 of target storage device 14 determines the updated data file as a function of the delta and a copy of the old data file. In general, processor 24 of target storage device modifies the old data file by the delta to determine the new data file. Storage 28 of target storage device 14 then stores the updated data file as shown in block 38.

Figure 3:
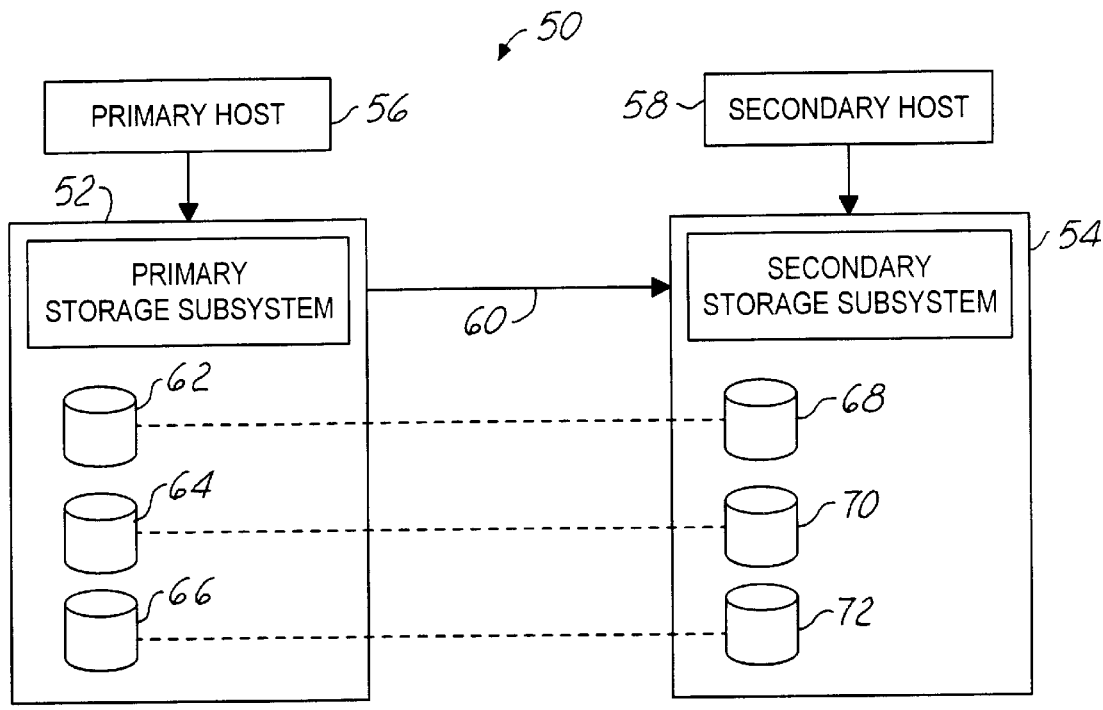
FIG. 3 illustrates an embodiment of the method and system of the present invention for use with a peer-to-peer remote copy (PPRC) storage system.

Referring now to FIG. 3, an embodiment of the method and system of the present invention for use with a peer-to-peer remote copy (PPRC) storage system 50 is shown. PPRC system 50 includes a primary storage subsystem 52 and a secondary storage subsystem 54. PPRC system 50 further includes a primary host 56 connected to primary storage 52 and a secondary host 58 connected to secondary storage 54. Primary host 56 stores data in primary storage 52. In general, data written to primary storage 52 is copied to secondary storage 54. The copy process creates a copy of the data from primary storage 52 into secondary storage 54. In PPRC system 50, a write made by primary host 56 is considered complete only after the data written to primary storage 52 is also written to secondary storage 54. Primary and secondary storage 52 and 54 may include various storage devices such as disks, tape, optical media, and the like.

A communication path 60 connects primary storage 52 with secondary storage 54. Primary storage 52 includes a set of storage volumes 62, 64, and 66. Secondary storage 54 includes a set of storage volumes 68, 70, and 72. Secondary storage volumes 68, 70, and 72 correspond to primary storage volumes 62, 64, and 66. The correspondence between the volumes in primary and secondary storage 52 and 54 is set up in PPRC pairs such that a storage volume in primary storage 52 has a corresponding storage volume in secondary storage 54. For instance, primary volume 62 is paired with secondary volume 68, primary volume 64 is paired with secondary volume 70, and primary volume 64 is paired with secondary volume 72. These pairs are referred to as established PPRC pairs.

In accordance with the method and system of the present invention, primary storage 52 sends a delta indicative of the differences between the new data and the old data over communication path 60 to secondary storage 54 each time new data is written to a primary storage volume by primary host 56. In contrast to prior art PPRC systems which transfer the entire updated data file from primary storage to secondary storage, PPRC system 50 only transfers the delta indicative of the differences between the updated data and the old data from primary storage 52 to secondary storage 54.

In operation, prior to the data being updated at primary storage 52, the primary storage and secondary storage 54 both have a copy of the old data. After primary storage 42 updates the data and transfers the delta to secondary storage 54, the secondary storage determines the updated data from the old data and the delta. Secondary storage 54 then copies the determined updated data file to the secondary storage volume corresponding to the primary storage volume. For example, if the updated data is written to primary storage volume 62 then the determined updated data is copied to the corresponding secondary storage volume 68. Similarly, if the updated data is written to primary storage volume 64 then the determined updated data is copied to the corresponding secondary storage volume 70.

In effect, the primary volume data is replicated to a corresponding secondary volume and the two volumes are kept in sync when new data writes are sent to the primary volume. It is the responsibility of primary storage 52 to send delta data indicative of all primary volume writes to the corresponding secondary volume of secondary storage 54. It is the responsibility of secondary storage 54 to disallow any read or write accesses to the secondary volume while the secondary volume is dedicated as secondary storage. These actions keep the content of the primary and secondary volumes identical.

Figure 4:
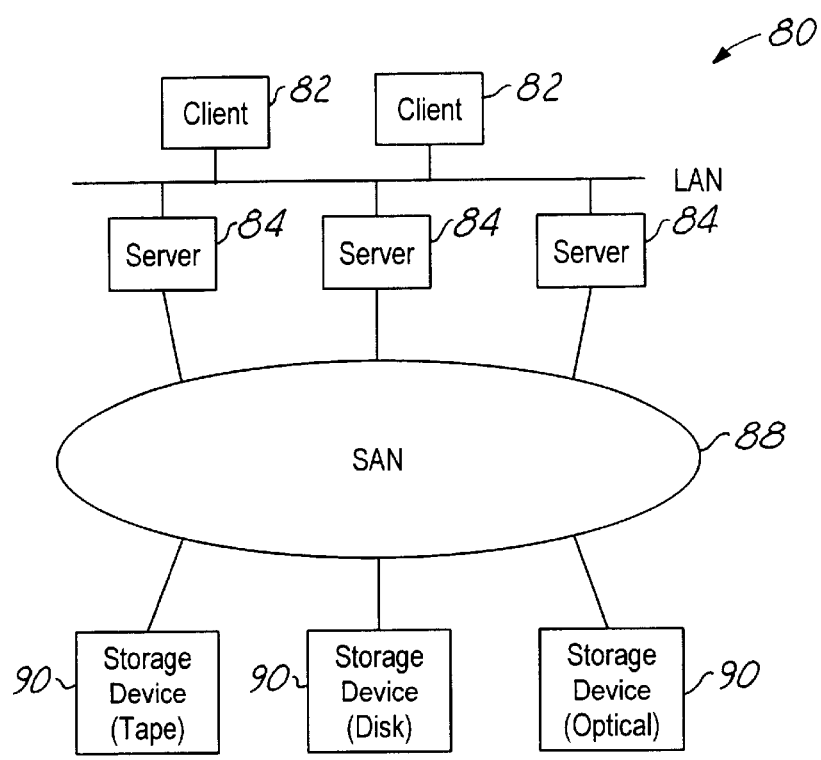
FIG. 4 illustrates an embodiment of the method and system of the present invention for use with a storage area network (SAN) storage system.

Referring now to FIG. 4, an embodiment of the method and system of the present invention for use with a storage area network (SAN) storage system 80 is shown. SAN storage system 80 includes a plurality of clients or host computers 82 and a plurality of servers 84 each connected to a local area network (LAN) 86. A storage area network (SAN) 88 connects servers 84 to a plurality of storage devices 90. In typical SAN storage systems, the clients write data to servers and the servers transport the data over the SAN for storage in one of the storage devices.

In accordance with the method and system of the present invention, both a server 84 and a storage device 90 of SAN storage system 80 have a copy of an old data file. Client 82 modifies the old data file with changes such that the old data file is now an updated data file. It is desired that the updated data file be stored over SAN 88 from server 84 onto storage device 90. In operation, server 84 sends a delta indicative of the differences between the updated data file and the old data file over SAN 88 to storage device 90 each time new data is written by client 82. In contrast to prior art SAN storage systems which transfer the entire updated data file from server 84 to storage device 90 via SAN 88, SAN storage system 80 only transfers the delta indicative of the differences between the updated data file and the old data file from the server to the storage device via the SAN.

In operation, server 84 loads a copy of the old data file from storage device 90 upon a request by client 82 to modify the old data file. As a result, prior to the old data file being updated by client 82 at server 84, the server and storage device 90 both have a copy of the old data file. After server 84 updates the data and transfers the delta to storage device 90, the storage device determines the updated data from the old data and the delta. Storage device 90 then replaces the old data file with the updated data file.

Figure 5:
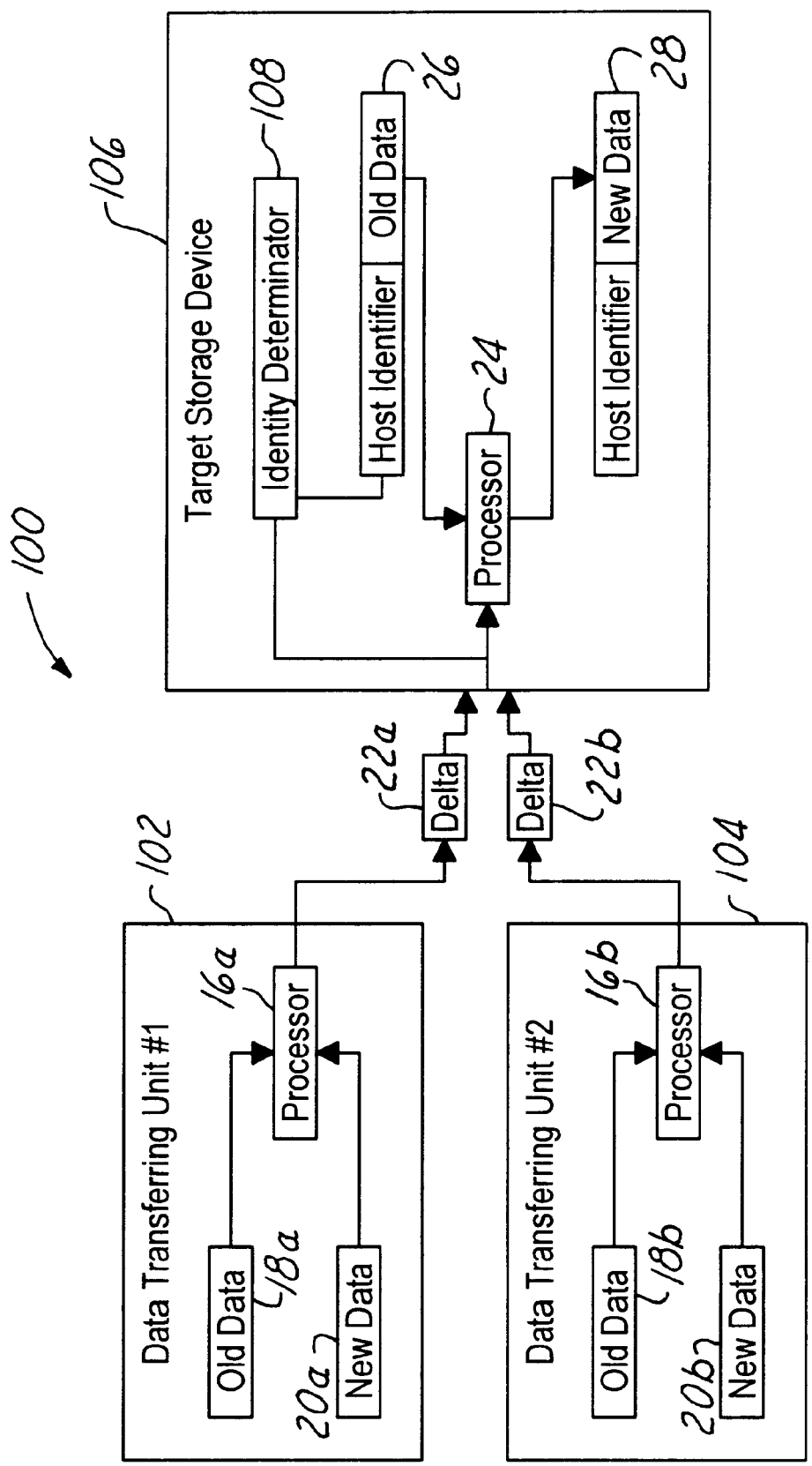
FIG. 5 illustrates an embodiment of the method and system of the present invention for use with a storage device having multiple hosts connected to a target storage device.

Referring now to FIG. 5, an embodiment of the method and system of the present invention for use with a storage system 100 having multiple hosts connected to a target storage device is shown. Storage system 100 is configured to expand the use of delta transfers in a multiple host environment. Storage system 100 includes two or more hosts such as data transferring unit 102 and data transferring unit 104. Each of data transferring units 102 and 104 includes the same components as data transferring unit 12 described with reference to FIGS. 1 and 2. Namely, data transferring units 102 and 104 respectively include processors 16a and 16b for determining the delta between an updated data file and an old version of the data file, copies of old data files 18a and 18b, and copies of updated data files 20a and 20b. The old data files 18a and 18b are different data files from one another and similarly the updated data files 20a and 20b are also different data files from one another. Processors 16a and 16b determine the deltas 22a and 22b between the old data files and the updated data files. Deltas 22a and 22b are different from each other depending upon the differences between the old data files and the updated data files in each of data transferring units 102 and 104. Data transferring units 102 and 104 transfer deltas 22a and 22b to a target storage device 106.

In order to support multiple host storage systems, meta data is transferred with deltas 22a and 22b indicating which data transferring unit 102 and 104 has sent a delta to target storage device 106. When target storage device 106 receives a delta a host identity determinator 108 in the target storage device studies the meta data sent with the delta. Host identity determinator 108 studies the meta data to determine the identity of the data transferring unit transferring the delta. Host identity determinator 108 determines if the data transferring unit that last transferred the delta is the same data transferring unit that is currently transferring the delta by comparing the meta data associated with the transferred delta with the meta data of the old data file 26 stored in target storage device 106. Typically, this is true and the transfer of the delta continues as described with reference to FIGS. 1 and 2. If not, the transfer of the delta will be rejected by target storage device 106 and a reason code will be sent by the target storage device to the data transferring unit that is transferring the delta. This data transferring unit will then transfer the entire updated data file to target storage device 106.

In summary, the method and system of the present invention work well in a PPRC application where a primary storage subsystem knows the contents of a secondary storage subsystem such that the primary storage subsystem can always transfer the delta instead of the entire updated data file. A cached controller could also determine if the prior data in the cache is for a write and has been previously sent to a target storage device. If so, the cached controller would just transfer the delta to the target storage device instead of the entire updated written data. The caching algorithm would be required to hold writes in the cache after the delta has been sent to the target storage device. As shown, the present invention is also applicable to SAN storage devices. The SAN could be made to cache data and transfer only the delta on cache hits to the target storage device. Data that is often referenced would transfer small deltas resulting in efficient utilization of the fibre connection. Further, the method and system of the present invention are generally for use with one or more hosts connected to a target storage device.

Thus it is apparent that there has been provided, in accordance with the present invention, a method and system for transferring difference data between new data and old data to a storage device for enabling the storage device to determine the new data from the stored old data and the transferred difference data and then replace the old data with the new data that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage system comprising:

a data transferring unit having an old data file and a new data file, the data transferring unit including a processor for comparing the new data file with the old data file to determine difference data indicative of the differences between the new data file and the old data file, the data transferring unit having a transmitter for transmitting the difference data; and a target storage device having the old data file, the target storage device having a receiver for receiving the difference data from the data transferring unit, the target storage device further having a processor for merging the old data file with the difference data file to determine the new data file, wherein upon determining the new data file the target storage device replaces the old data file with the new data file.

2. The storage system of claim 1 wherein:

the storage system is a peer-to-peer remote copy (PPRC) storage system, wherein the data transferring unit is a primary storage system of the PPRC storage system and- the target storage device is a secondary storage system of the PPRC storage system.

3. The storage system of claim 1 wherein:

the storage system is a storage area network (SAN) storage system, wherein the target storage device is a storage device of the SAN storage system.

4. The storage system of claim 1 wherein:

the data transferring unit is a cache.

5. The storage system of claim 1 wherein:

the difference data includes information indicative of an offset data file location between respective data file locations of the old data file and the new data file which are different.

6. The storage system of claim 5 wherein:

the difference data includes information indicative of a length of data bytes at the offset data file location between respective data file locations of the old data file and the new data file which are different.

7. The storage system of claim 6 wherein:

the difference data includes information indicative of data bytes at the offset data file location between respective data file locations of the old data file and the new data file which are different.

8. A peer-to-peer remote copy (PPRC) storage system comprising:

a primary storage system having an old data file and a new data file, the primary storage system operable for comparing the new data file with the old data file to determine difference data indicative of the differences between the new data file and the old data file; and a secondary storage system having the old data file, the secondary storage system operable for receiving the difference data from the primary storage system and for merging the old data file with the difference data to determine the new data file, wherein upon determining the new data file the secondary storage system replaces the old data file with the new data file.

9. A storage area network (SAN) storage system comprising:

a storage area network;

a server connected to the storage area network, the server having an old data file and a new data file, the server operable for comparing the new data file with the old data file to determine difference data indicative of the differences between the new data file and the old data file; and a target storage device connected to the storage area network, the target storage device having the old data file, the target storage device operable for receiving the difference data from the server and for merging the old data file with the difference data to determine the new data file, wherein upon determining the new data file the target storage device replaces the old data file with the new data file.

10. A method for storing data in a storage system, the method comprising:

storing an old data file at a data transferring unit and a target storage device;

receiving a new data file at the data transferring unit;

comparing the new data file with the old data file at the data transferring unit to determine difference data indicative of the differences between the new data file and the old data file;

transmitting the difference data from the data transferring unit to the target storage device;

receiving the difference data at the target storage device from the data transferring unit;

merging the old data file with the difference data at the target storage device to determine the new data file; and replacing the old data file with the determined new data file at the target storage device.

11. The method of claim 10 wherein:

the storage system is a peer-to-peer remote copy (PPRC) storage system, wherein the data transferring unit is a primary storage system of the PPRC storage system and the target storage device is a secondary storage system of the PPRC storage system.

12. The method of claim 10 wherein:

the storage system is a storage area network (SAN) storage system, wherein the target storage device is a storage device of the SAN storage system.

13. The method of claim 10 wherein:

comparing the new data file with the old data file at the data transferring unit to determine difference data indicative of the differences between the new data file and the old data file includes determining information indicative of an offset data file location between respective data file locations of the old data file and the new data file which are different.

14. The method of claim 13 wherein:

comparing the new data file with the old data file at the data transferring unit to determine difference data indicative of the differences between the new data file and the old data file includes determining information indicative of a length of data bytes at the offset data file location between respective data file locations of the old data file and the new data file which are different.

15. The method of claim 14 wherein:

comparing the new data file with the old data file at the data transferring unit to determine difference data indicative of the differences between the new data file and the old data file includes determining information indicative of data bytes at the offset data file location between respective data file locations of the old data file and the new data file which are different.

16. A storage system comprising:

a first data transferring unit having first old and new data files, the first data transferring unit including a first processor for comparing the first new and old data files to determine a first difference data indicative of the differences between the first new and old data files, the first data transferring unit having a first transmitter for transmitting the first difference data with first meta data, the first meta data indicative of the first difference data being associated with the first data transferring unit and the first old and new data files;

a second data transferring unit having second old and new data files, the second data transferring unit including a second processor for comparing the second new and old data files to determine a second difference data indicative of the differences between the second new and old data files, the second data transferring unit having a second transmitter for transmitting the second difference data with second meta data, the second meta data indicative of the second difference data being associated with the second data transferring unit and the second old and new data files; and a target storage device having the first and second old data files, the target storage device having a receiver for receiving the first and second difference data and the first and second meta data from the first and second data transferring units, the target storage device further having a processor for merging the first and second old data files with the first and second difference data file to determine the first and second new data files, and for analyzing the meta data to determine which data transferring unit and old and new data files are associated with the difference data, wherein upon determining the first and second new data files the target storage device replaces the first and second old data files with the first and second new data files.

* * * * *